United States Patent Office 2,787,540
Patented Apr. 2, 1957

2,787,540

RECOVERY OF PLATINUM

Herbert R. Appell, Chicago, Ill., assignor to Universal Oil Products Company, Chicago, Ill., a corporation of Delaware No Drawing. Application December 22, 1949, Serial No. 134,585

6 Claims. (Cl. 75—108)

This invention relates to the recovery of platinum and more particularly to an improved method for recovering platinum from catalysts having platinum associated with refractory oxides, such as one or more of the oxides of aluminum, zinc, zirconium, magnesium, titanium, vanadium, manganese, beryllium, etc.

Catalysts as hereinbefore set forth may be used for effecting reactions of organic compounds including dehydrogenation, hydrogenation, cyclization, hydrocracking, reforming, oxidation, etc. of organic compounds and particularly of hydrocarbons. After use, the activity of the catalyst declines. While the activity in some cases may be restored by oxidation to burn off carbonaceous deposits therefrom, eventually it is necessary to replace the catalyst. The present invention is directed to a novel method of treating the catalyst to recover the platinum. The recovered platinum is advantageously used for the preparation of new catalysts or it may be used for any other desirable purpose.

The platinum may be recovered by treating the catalyst with a suitable acid or alkali to dissolve the metal oxide and to free the platinum in a finely divided or colloidal state and thereafter dissolving the platinum by means of aqua regia. This method is satisfactory where the process in which the catalyst is used does not require a substantially pure catalyst and the presence of impurities therefore are not too harmful. On the other hand, it is an important requirement that certain platinum-containing catalysts be substantially free from impurites and, in such cases, it is necessary to further separate the subsequently precipitated platinum from the impurities. This separation is generally effected by dissolving the impurities but it has been found that some of the platinum redissolves, if oxidizing agents are present, and the present invention is directed to a novel method of effecting this separation with a minimum of redissolving of the platinum.

In another embodiment the present invention is directed to an improved method of effecting precipitation of the platinum.

The present invention relates to an improvement in the process for the recovery of platinum from a platinum-refractory metal oxide catalyst wherein the platinum is treated with aqua regia and recovered as a soluble compound, said improvement comprising precipitating platinum and adding to the resultant mixture of platinum and liquid a compound which prevents redissolving of the platinum, or precipitating platinum in the presence of a compound which will prevent it from redissolving.

In a specific embodiment, precipitation of the platinum is effected by means of hydrazine hydrate.

In still another specific embodiment, the compound added to prevent redissolution of the platinum comprises formamide.

As hereinbefore set forth, it is an important requirement in certain catalysts that impurities in the catalyst be kept to a minimum. A specific example of such a catalyst comprises the recent "platforming" catalyst as described in Vladimir Haensel Patent 2,479,109, issued on August 16, 1949. In view of the small amounts of platinum and of combined halogen contained in this catalyst, it is readily apparent that the impurities in the catalyst should be kept to a minimum in order to obtain full benefit of the small amounts of platinum and combined halogen.

In the interest of simplicity, the following description will be directed primarily to the recovery of platinum from an alumina-platinum catalyst which has been contaminated with carbonaceous deposits, although it is understood that the novel features of the present invention may be applied to other platinum-containing catalysts as hereinbefore set forth.

In accordance with the present invention, deactivated alumina-platinum catalyst, which may or may not contain combined halogen, is treated with an acid such as sulfuric acid, hydrochloric acid, chlorosulfuric acid, nitric acid, hydrobromic acid, etc. or an alkali metal hydroxide solution, such as strong sodium hydroxide, potassium hydroxide, etc. solutions, which is capable of reacting with the alumina and forming a soluble compound thereof. It is understood that, with catalysts other than alumina-platinum, the particular acid or alkali to be employed will depend upon the particular refractory metal oxide in the catalyst. Thus, when the base comprises beryllium oxide concentrated sulfuric acid should be utilized and when the base comprises vanadium oxide nitric acid should be employed, etc. The acid or base employed should be of sufficient strength to effect the desired reaction. Sulfuric acid of from about 25% to about 60% may be used and preferably is the order of 50%. Hydrochloric acid of about 37% is satisfactory.

Sulfuric acid is preferred because the reaction is facilitated by heating and sulfuric acid has a high boiling point which permits the use of a higher temperature. The reaction preferably is effected under refluxing conditions and the bottom temperature will generally be within the range of from about 100° to about 130° C. The time of heating and digesting will range from about 0.5 to 12 hours or more and in most cases will be of the order of about 1 hour. In order to facilitate the reaction, it is preferred that the catalyst be in finely divided condition and this may readily be effected by suitably grinding the catalyst in case the catalyst particle size is too large.

In one embodiment of the invention, where the catalyst is contaminated with carbonaceous deposits which generally will be the case, the carbon may be removed by an oxidation or burning operation, after which the catalyst is treated with the acid as aforesaid. In another embodiment of the invention the catalyst containing the carbonaceous material is treated with the acid and the carbon is removed in a later step. This latter method is advantageous when the aluminum sulfate, formed by the treatment with sulfuric acid and dissolved by the addition of water, is to be separated from the residue by a filtering operation.

After separation of the filtrate, the residue will contain platinum and carbon where the carbon had not previously been removed. The residue is preferably dried which may be effected either at atmospheric temperature over a period of from about 5 to 10 hours or more or at an elevated temperature of from about 100° to about 300° C. for a period of from about 2 to 24 hours or more. The dried material is then subjected to oxidation at a temperature of from about 400° to 700° C. or more in order to burn off the carbon. This same method may be used as a first step in the process when it is desired to remove the carbonaceous material before treatment with acid.

The residue is then treated with aqua regia and this may be effected by adding both the hydrochloric acid and nitric acid at the same time or first adding one acid and then the other acid. In a preferred method the residue is first treated with hydrochloric acid and heated to refluxing conditions for a time sufficient to dissolve the remaining impurities and the nitric acid is added to the mixture and further heated under refluxing conditions. The product is then heated sufficiently to remove the solvent. When necessary, the treatment with hydrochloric acid, alone or together with nitric acid, may be repeated in order to insure complete dissolution of the platinum, after which the residue is again heated to dryness to vaporize the solvent.

The solvent includes compounds of nitric acid, hydrochloric acid and water, and it has been found that certain of these compounds, such as nitrosyl chloride, nitrous oxides, dissolved chlorine, etc. in acid solution tend to subsequently dissolve the platinum or form compounds which dissolve the platinum. It is difficult to remove all of the compounds which dissolve platinum by merely vaporizing the solvent. Usually an excessive number of evaporations to dryness, with addition of hydrochloric acid whenever the chloroplatinic acid becomes dry, is necessary to remove all compounds which dissolve platinum.

In one embodiment of this invention a compound is added to the chloroplatinic acid solution which reacts with substances which dissolve platinum. This compound may be added at this stage of the process or after the platinum is precipitated. This novel step eliminates the necessity of numerous evaporations with hydrochloric acid at this point.

Water is then added in order to form a clear solution and the solution is filtered to separate the soluble platinum compound formed by the aqua regia treatment. In the next step of the process the soluble platinum compound is treated with a precipitating agent to precipitate platinum. However, this solution will contain impurities originally present in the catalyst or introduced during the handling thereof and the next step of the treatment is directed to separating the platinum from the impurities. As hereinbefore set forth, the present process includes the use of hydrazine hydrate to precipitate the platinum. It has been found that for complete precipitation at least 0.57 grams of hydrazine hydrate must be used per gram of platinum in solutions such as chloroplatinic acid. Preferably a small excess of the order of 10% is utilized in order to insure rapid and complete precipitation. The hydrazine hydrate may be used in an aqueous solution varying from 1 to 85% concentration and preferably is of the order 5 to 30% concentration.

When precipitating the platinum, metallic impurities such as iron, copper, nickel, chromium, etc. usually contaminate the precipitate and it becomes necessary to digest the precipitate in acid solution in order to remove said contaminants.

While hydrazine hydrate is the preferred compound for precipitating platinum, it is understood that any other compound may be used for this purpose, including metals such as aluminum, zinc, magnesium, etc. but, as hereinbefore set forth, most of these metals would constitute an undesirable impurity in the catalyst and, therefore, should not be used in catalysts which require an extremely high purity. Aluminum or magnesium metals may be used satisfactorily provided they are sufficiently pure so as not to introduce undesirable impurities from this source.

As hereinbefore set forth, the excess aqua regia will either redissolve the platinum or form compounds which will redissolve the platinum, and it is a novel feature of the present invention that a compound is added to the colloidal suspension of precipitated platinum to prevent this. A preferred compound for use in accordance with the present invention comprises formamide. It is understood that higher amides including the amides of acetic acid, propionic acid, butyric acid, valeric acid, etc. may be employed but not necessarily with equivalent results.

Another satisfactory agent for preventing redissolving of the platinum comprises a soluble metal iodide particularly sodium iodide, potassium iodide, etc., preferably along with urea or similar compounds which, in combination with the precipitating agent and the soluble metal iodide, facilitates precipitation and prevents redissolving of the platinum. In general, the amide is preferred because it entails the use of only one compound and not two compounds as in the case of the soluble metal iodide and urea. While the iodide may be used alone, a large amount thereof is required and this would result in considerable iodine being liberated which in turn, would cause side reactions. It is understood that the hydrazine hydrate or the amide or urea and iodide may be added at the same time, or one added first and then the other one added later.

After the platinum has been precipitated, it is necessary to remove impurities such as iron, lead, etc. and this is readily accomplished by adding a mineral acid, preferably hydrochloric acid, and then preferably heating the mixture to boiling. The acid may be dilute or concentrated, and the time of heating may range from about ¼ hour to 2 hours or more in order to insure complete reaction of the impurities, after which the supernatant liquid may be drained off and/or the product may be filtered to recover the platinum. It is understood that the treatment with mineral acid may be repeated if necessary in order to insure substantially complete removal of the impurities. It is understood that the filtrate recovered in the various steps of the process may be treated in any suitable manner to recover any small traces of platinum which may be present therein.

The following examples are introduced to illustrate further the novelty and utility of the present invention but not with the intention of unduly limiting the same.

Example I

A spent alumina-platinum-combined halogen catalyst was removed from a platforming operation and the catalyst was subjected to treatment in the following manner. This catalyst contained 0.3% by weight of platinum. The spent catalyst was covered with water and then 96% sulfuric acid was added at such a rate that boiling occured, after which an equal volume of water was added and the mixture was heated to boiling and refluxed for 1 hour. The mixture was diluted with 3 equal volumes of water, allowed to cool somewhat and then was filtered. The residue was ignited at a temperature of about 540° C. to burn off carbonaceous materials, the resultant residue containing about 20% platinum.

The residue was covered with 4 ml. of concentrated hydrochloric acid for each gram of platinum, heated gently for a few minutes and then 0.75 ml. of concentrated nitric acid was added slowly. The mixture was kept at its boiling point for 1 hour and the mixture became nearly dry. Three ml. of concentrated hydrochloric acid was added and the solution was again evaporated to dryness. The resultant chloroplatinic acid was dissolved by the addition of 5 ml. of water and separated from the insoluble residue by filtration. The residue was washed until the filtrate showed no platinum when tested with stannous chloride.

The chloroplatinic acid solution was heated to its boiling point and then 8 ml. per gram of platinum of 10% hydrazine hydrate was slowly added. When the addition of hydrazine hydrate was completed, 0.3 grams of urea and 0.2 grams of sodium iodide were added and the solution was heated to the boiling point and maintained at that temperature for ½ hour. The supernatant liquid was then tested for platinum by reaction with stannous chloride reagent. When the test is positive an additional 3 cc. of hydrazine hydrate is added and the solution is kept at the boiling point for ½ hour. However in most cases the test for platinum will be negative, and 25 ml. of concentrated hydrochloric acid is added and the solution heated for a short time. The supernatant liquid is decanted and filtered to recover any stray particles of platinum. The residue which contained platinum and remaining impurities is treated with 50 ml. of hydrochloric acid (one part concentrated hydrochloric acid and four parts water) and the resultant suspension is heated to boiling and maintained at this temperature for 15 minutes. The clear liquid is tested for impurities and, if the test is positive, the liquid is decanted and the digestion is repeated with fresh acid. When testing for iron, a suitable test includes the use of thiocyanate reagent. When the test is negative, the platinum is collected by filtration on an ashless filter paper and the filter paper removed by ignition at a temperature of about 540° C.

It has been found that 1 gram of platinum is dissolved with a solution of aqua regia consisting of 3.5 ml. of concentrated hydrochloric acid, 0.6 ml. of nitric acid and 0.8 ml. of water. Substantially complete recovery of the platinum was effected in the above manner.

*Example II*

This example described another operation which was conducted in substantially the same manner as described in Example I except that formamide was used in place of the urea and sodium iodide. It has been found that formamide eliminates nitrous oxides, nitrosyl chloride and chlorine from the solution. 2 ml. of formamide was found to be sufficient to destroy 1 ml. of concentrated nitric acid or its equivalent in aqua regia. It has further been found that approximately 25 to 30% of nitric acid which was used in excess remains and must be removed by formamide at the time of precipitation.

*Example III*

In a preparation similar to that described in Example II but omitting the formamide, it was found that the filtrate gave a definite test for chloroplatinic acid when tested with stannous chloride and for oxidizing agents when tested with starch-iodide paper. On the other hand, when formamide was added in the manner as described in Example II, these tests proved negative and showed no chloroplatinic acid or oxidizing agents.

I claim as my invention:

1. In the recovery of platinum from a catalyst containing the same, wherein the platinum is dissolved in aqua regia and subsequently precipitated from the solution by the addition of a precipitating agent for platinum, the improvement which comprises also adding an amide to prevent redissolving of the precipitated platinum.

2. The improvement as defined in claim 1 further characterized in that said amide is present in said solution during the precipitation of the platinum therefrom.

3. In the recovery of platinum from a catalyst containing the same, wherein the platinum is dissolved in aqua regia and subsequently precipitated from the solution by the addition of a precipitating agent for platinum, the improvement which comprises adding an amide to the resultant mixture of precipitated platinum and liquid to prevent redissolving of the platinum precipitate.

4. The improvement as defined in claim 1 further characterized in that said amide is formamide.

5. In the recovery of platinum from a catalyst containing the same, wherein the platinum is dissolved in aqua regia and subsequently precipitated from the solution by the addition of a precipitating agent for platinum, the improvement which comprises adding urea and a soluble metal iodide to prevent redissolving of the precipitated platinum.

6. The improvement as defined in claim 3 further characterized in that said amide is formamide.

References Cited in the file of this patent

Smith: Inorganic Chemistry, 3rd edition, The Century Co., New York (1921), pages 536–537.

Thorpe's Dictionary of Applied Chemistry, vol. I, 4th edition, Longmans, Green and Company, New York, (1937), page 453.

"Comprehensive Treatise on Inorganic and Theoretical Chemistry," by Mellor, vol. 8 published by Longmans, Green & Co., 1928, pages 308, 319, and 320.

Sidgwick, N. V.: The Organic Chemistry of Nitrogen, Clarendon Press, Oxford, England (1937), page 279.

"Protective Coatings for Metals," by Burns and Schuh, published by the Reinhold Publishing Corp., 1939, page 61.

Hopkins, B. S.: "General Chemistry for Colleges," D. C. Heath and Company, New York, 3rd edition (1942), page 343.

Degering, E. F.: An Outline of Organic Nitrogen Compounds, University Lithoprinters, Ypsilanti, Michigan (1945), page 427.